(12) United States Patent
Fan

(10) Patent No.: US 11,933,349 B2
(45) Date of Patent: Mar. 19, 2024

(54) DOVETAIL STRUCTURE OF CONNECTOR

(71) Applicant: P-TWO INDUSTRIES INC., Taoyuan (TW)

(72) Inventor: Jo-Ming Fan, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 676 days.

(21) Appl. No.: 16/993,225

(22) Filed: Aug. 13, 2020

(65) Prior Publication Data

US 2021/0285478 A1 Sep. 16, 2021

(30) Foreign Application Priority Data

Mar. 11, 2020 (TW) ................................ 109202883

(51) Int. Cl.
*F16B 5/06* (2006.01)
*F16B 5/00* (2006.01)

(52) U.S. Cl.
CPC .......... *F16B 5/0664* (2013.01); *F16B 5/0052* (2013.01); *F16B 2200/30* (2018.08)

(58) Field of Classification Search
CPC .... F16B 5/0052; F16B 5/0664; F16B 12/125; F16B 12/26; F16B 12/38; F16B 2200/30; B60R 16/0222; H01R 13/426; H01R 13/514; H01R 13/518
USPC ................................................. 439/716, 717
See application file for complete search history.

(56) References Cited

U.S. PATENT DOCUMENTS

| 3,402,954 | A | * | 9/1968 | Simon | H01R 13/502 403/381 |
| 4,019,298 | A | * | 4/1977 | Johnson, IV | E04B 1/54 403/381 |
| 4,867,598 | A | * | 9/1989 | Winter, IV | E04B 2/08 403/381 |
| 5,720,537 | A | * | 2/1998 | Lutz | A47B 87/0246 248/688 |
| 5,913,781 | A | * | 6/1999 | Vidmar | E04H 17/1447 47/33 |
| 6,332,813 | B1 | * | 12/2001 | Okabe | H01R 13/514 439/701 |
| 7,244,131 | B1 | * | 7/2007 | Khemakhem | H01R 13/6616 439/188 |
| 7,413,481 | B2 | * | 8/2008 | Redmond, III | H01R 13/514 439/717 |
| 7,419,141 | B2 | * | 9/2008 | Wall | E04H 17/16 256/65.02 |
| 7,625,250 | B2 | * | 12/2009 | Blackwell | H05K 7/1425 439/717 |
| 8,662,120 | B2 | * | 3/2014 | Riviere | B27M 3/0066 144/347 |
| 9,231,332 | B2 | * | 1/2016 | Chai | H01R 13/514 |
| 2007/0190865 | A1 | * | 8/2007 | Slack | B01D 24/4631 439/716 |

(Continued)

*Primary Examiner* — Amber R Anderson
*Assistant Examiner* — Kevin J Baynes
(74) *Attorney, Agent, or Firm* — Muncy, Geissler, Olds & Lowe, P.C.

(57) ABSTRACT

The present invention provides a dovetail structure of a connector that can be disposed on a first joint surface and a second joint surface of a casing. The dovetail structure includes a pin module and a slot module. An interference structure formed by the pin module and the slot module enables the two connectors with a dovetail structure to be assembled easily to achieve a stable combination.

5 Claims, 7 Drawing Sheets

(56) References Cited

U.S. PATENT DOCUMENTS

2015/0093184 A1\* 4/2015 Henry .................. E04B 1/2604
403/187

\* cited by examiner

DOVETAIL STRUCTURE OF CONNECTOR

CROSS-REFERENCE TO RELATED APPLICATIONS

This non-provisional application claims priority under 35 U.S.C. § 119(a) on Patent Application No(s). 109202883 filed in Taiwan, R.O.C. on Mar. 11, 2020, the entire contents of which are hereby incorporated by reference.

FIELD OF THE INVENTION

The present invention relates to the technical field of connectors, and more particularly to a dovetail structure applied to a connector for building a number of modules.

BACKGROUND OF THE INVENTION

A conventional connector such as an automotive connector is installed in a car for connecting electronic devices. The quantity of connectors used in the car depends on various models of cars provided by different manufacturers. For example, some models of cars require two connectors and some require five connectors. Therefore, the manufactures have to prepare different molds to meet different requirements, since these connectors cannot be used universally for different models of cars provided by different manufacturers.

To overcome the aforementioned problems, related connector manufacturers propose a variety of modular combining methods. Although these methods can overcome the problems of the prior art, yet it takes a lot of effort and time for the assemblers to making connections by the connectors during the assembling process. As the quantity of connectors used for the assembly changes, deformations may occur easily due to stresses or tensions and cause the connector to be compressed or even affect subsequent connections and change electrical properties.

In view of the aforementioned drawbacks of the prior art, the present invention discloses a dovetail structure of a connector to overcome the drawbacks of the prior art.

SUMMARY OF THE INVENTION

A first objective of the present invention is to provide a dovetail structure of a connector that can achieve the effects of assembling a plurality of connectors modularly.

A second objective of the present invention is to provide a step structure based on the dovetail structure for assembling two casings easily and connecting the two casings with one another securely.

A third objective of the present invention is to provide an easy alignment in an early assembling stage based on the dovetail structure and achieve a tight fit effect by using an interference structure in a late assembling stage.

A fourth objective of the present invention is to provide a stop structure (or a latch structure) for preventing the combined casings from separating from each other or falling out.

A fifth objective of the present invention is to provide a casing with a deformation slot based on the dovetail structure, so that when two connectors are combined with each other and interference occurs, an elastic deformation space is provided for accommodating the deformation.

A sixth objective of the present invention is to a high-flatness combination based on the dovetail structure to prevent deformations occurred in the combination.

A seventh objective of the present invention is to provide an automotive connector based on the dovetail structure.

To achieve the aforementioned and other objectives, the present invention discloses a dovetail structure of a connector disposed on a first joint surface and a second joint surface of a casing. The dovetail structure comprises a pin module and a slot module. The pin module is disposed on the first joint surface. The pin module has a first guide block and a second guide block. The first guide block and the second guide block are parallel to each other and have a first dovetail tenon and a second dovetail tenon formed thereon respectively. A first outer edge distance existed between the first guide block and the second guide block of the first dovetail tenon, and a second outer edge distance existed between the first guide block and the second guide block of the second dovetail tenon, and the first outer edge distance is smaller than the second outer edge distance. The slot module is disposed on the second joint surface. The slot module has a first guide slot and a second guide slot. The first guide slot and the second guide slot are parallel to each other and have a first dovetail tenon hole and a second dovetail tenon hole formed thereon respectively. A first inner edge distance existed between the first guide slot and the second guide slot of the first dovetail tenon hole, and a second inner edge distance existed between the first guide slot and the second guide slot of the second dovetail tenon hole, and the first inner edge distance is greater than the second inner edge distance. Wherein, the first inner edge distance and the second inner edge distance are greater than or equal to the first outer edge distance and the second outer edge distance. Wherein, a side of the first guide block away from the second guide block is concaved inward to form a first concave structure, and a side of the second guide block away from the first guide block is concaved inward to form a second concave structure, and the first concave structure and the second concave structure are symmetrical to each other, so that the pin module can be inserted into the slot module.

To achieve the aforementioned and other objectives, the present invention further discloses a connector with a dovetail structure and comprising a casing, a pin module and a slot module. The casing provides a first joint surface and a second joint surface. The pin module is disposed on the first joint surface. The pin module has a first guide block and a second guide block. The first guide block and the second guide block are parallel to each other and have a first dovetail tenon and a second dovetail tenon formed thereon respectively. A first outer edge distance existed between the first guide block and the second guide block of the first dovetail tenon, and a second outer edge distance existed between the first guide block and the second guide block of the second dovetail tenon, and the first outer edge distance is smaller than the second outer edge distance. The slot module is disposed on the second joint surface. The slot module has a first guide slot and a second guide slot. The first guide slot and the second guide slot are parallel to each other and have a first dovetail tenon hole and a second dovetail tenon hole formed thereon respectively. A first inner edge distance existed between the first guide slot and the second guide slot of the first dovetail tenon hole, and a second inner edge distance existed between the first guide slot and the second guide slot of the second dovetail tenon hole, and the first inner edge distance is greater than the second inner edge distance. The first inner edge distance and the second inner edge distance are greater than or equal to the first outer edge distance and the second outer edge distance. Wherein, a side of the first guide block away from the second guide block is concaved inward to form a first concave structure, and a side of the second guide block away from the first guide block is concaved inward to form a second concave structure, and the first concave structure and the second concave structure are symmetrical to each other, so that the pin module can be inserted into the slot module.

To achieve the aforementioned and other objectives, the present invention further discloses a connector with a dovetail structure component. The connector component comprises a first connector and a second connector. The first connector comprises a first casing, a first pin module and a first slot module. The first pin module and the first slot module are disposed on the first casing. The first pin module has a first dovetail tenon and a second dovetail tenon formed thereon. The first slot module has a first dovetail tenon hole and a second dovetail tenon hole formed thereon. Wherein, the first outer edge distance of the first dovetail tenon is smaller than the second outer edge distance of the second dovetail tenon. The first inner edge distance of the first dovetail tenon hole is greater than the second inner edge distance of the second dovetail tenon hole, and the first inner edge distance and the second inner edge distance are greater than or equal to the first outer edge distance and the second outer edge distance. The second connector comprises a second casing, a second pin module and a second slot module. The second pin module and the second slot module are disposed on the second casing. The second pin module has a third dovetail tenon and a fourth dovetail tenon formed thereon. The second slot module has a third dovetail tenon hole and a fourth dovetail tenon hole formed thereon. Wherein, the third outer edge distance of the third dovetail tenon is smaller than the fourth outer edge distance of the fourth dovetail tenon. The third inner edge distance of the third dovetail tenon hole is greater than the fourth inner edge distance of the fourth dovetail tenon hole, and the third inner edge distance and the fourth inner edge distance are greater than or equal to the outer edge distance. When the first dovetail tenon moves along the three dovetail tenon holes, the first pin module combines with the second slot module. Until the second dovetail tenon touches the third dovetail tenon hole and the first dovetail tenon touches the fourth dovetail tenon hole, the second dovetail tenon and the third dovetail tenon hole have an interference with each other and the first dovetail tenon and the fourth dovetail tenon hole have an interference with each other, so that the first pin module has a tight fit with the second slot module. Wherein both sides of the first dovetail tenon and the second dovetail tenon are concaved inwards, each forming a first concave structure, and the first concave structures are mutually symmetrical, and both sides of the third dovetail and the fourth dovetail are also concaved inwards, each forming a second concave structure, and the second concave structures are mutually symmetrical.

Compared with the prior art, the quantity of dovetail structures of the present invention can be adjusted according to actual needs, this invention no longer needs additional molds designed for a fixed quantity. Particularly, the present invention provides a stepped interference structure that can achieves the effects of easy assembling and secured combination.

DESCRIPTION OF THE PREFERRED EMBODIMENTS

The technical characteristics of the present invention will become apparent with the detailed description of preferred embodiments accompanied with the illustration of related drawings. It is intended that the embodiments and drawings disclosed herein are to be considered illustrative rather than restrictive.

In this invention, the terms "a" and "one" are used as a unit, an element and a component for the description of this specification to facilitate the description and provide a general meaning to the scope of the invention, so that both "a" and "one" refer to one or at least one including an odd or even number, unless otherwise specified.

In this invention, the terms "comprising", "including", "having" "containing" or any other similar terminologies intend to cover non-exclusive contents. For example, the invention comprising an element of a plurality of elements, structures, products, or devices is not limited to the elements listed in the specification only, but also including other usually inherent elements, structures, products or devices which are not listed specifically. Unless otherwise specified, the term "or" refers to the inclusive "or", but not the exclusive "or".

Figure 1:
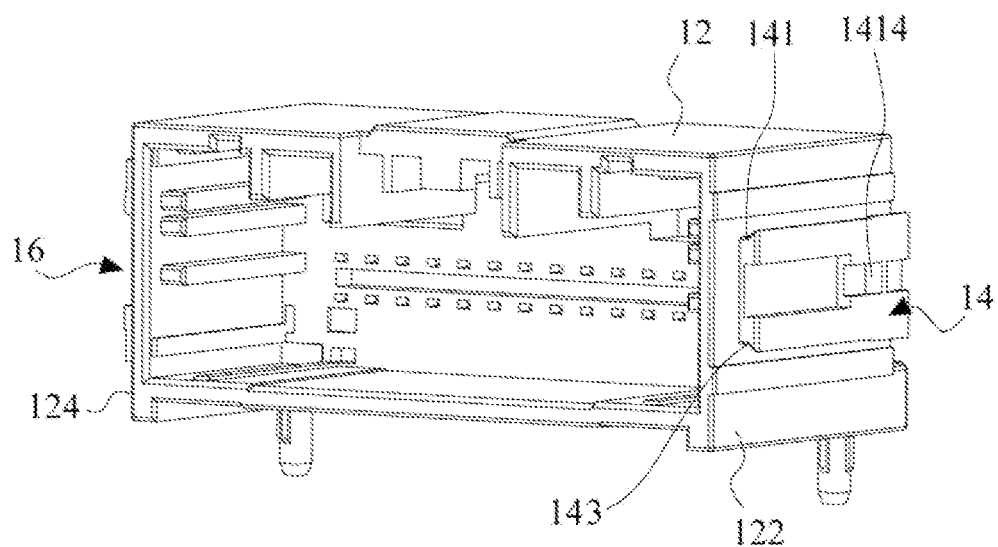
FIG. 1 is a schematic view of a dovetail structure applied to a connector in accordance with an embodiment of the present invention.

With reference to FIG. 1 for a schematic view of a dovetail structure applied to a connector in accordance with an embodiment of the present invention, the connector having a dovetail structure 10 comprises a casing 12, a pin module 14 and a slot module 16.

The casing 12 provides a first joint surface 122 and a second joint surface 124 opposite to the first joint surface 122.

The pin module 14 is disposed on the first joint surface 122 and has a first guide block 142 and a second guide block 144. The first guide block 142 and the second guide block 144 are parallel to each other and provided to form a first dovetail tenon 146 and a second dovetail tenon 148 respectively.

Figure 2:
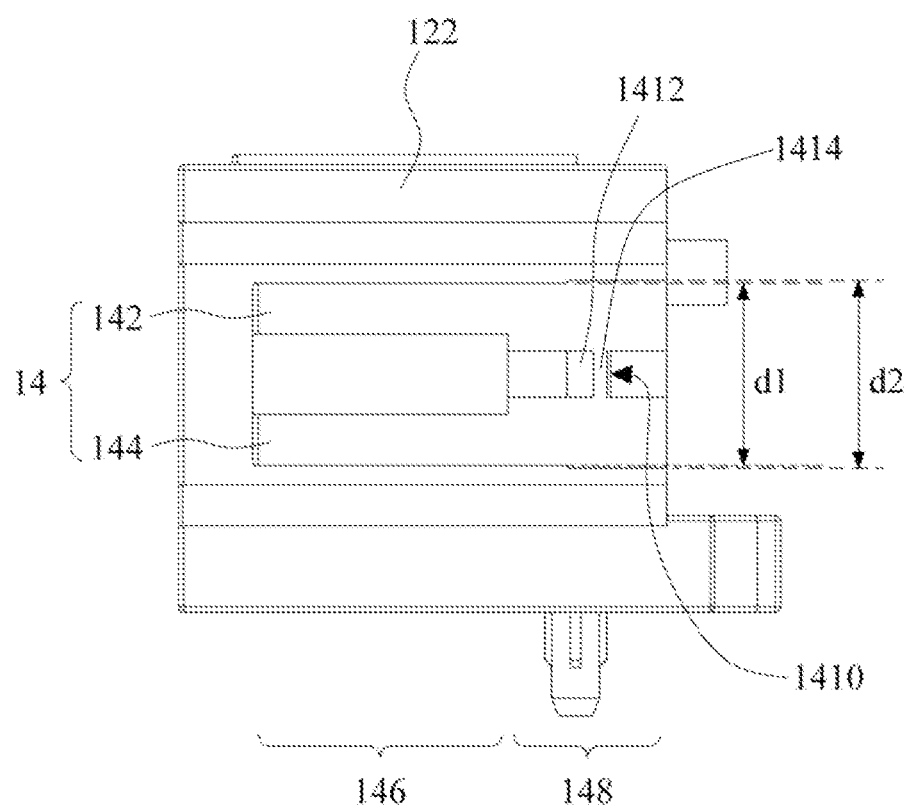
FIG. 2 is a schematic view of a pin module installed to the casing of the present invention as depicted in FIG. 1.

With reference to FIG. 2 for a schematic view of installing a pin module to a casing in accordance with the present invention, an outer edge distance d1 between the first guide block 142 and the second guide block 144 of the first dovetail tenon 146 is smaller than the outer edge distance d2 between the second guide block 144 and the first guide block 142 of the second dovetail tenon 148. In this embodiment, the outer edge distance refers to the distance between the outer edge of the first guide block 142 and the outer edge of the second guide block 144 as shown in the figure.

In this embodiment, the pin module 14 further comprises a first stopper 1410 having a first bevel 1412. The first stopper 1410 is installed at the second dovetail tenon 148, and the first stopper 1410 can also be installed at any position of the pin module 14 in another embodiment. The first guide block 142 and the second guide block 144 of the second dovetail tenon 148 are coupled to each other by a connecting member 1414 to form a first stopper 1410, and the structure of the connecting member 1414 can enhance the connection strength. In another embodiment, the structure of the connecting member 1414 is not limited to the aforementioned arrangement of connecting to the first guide block 142 and the second guide block 144 only.

Figure 3:
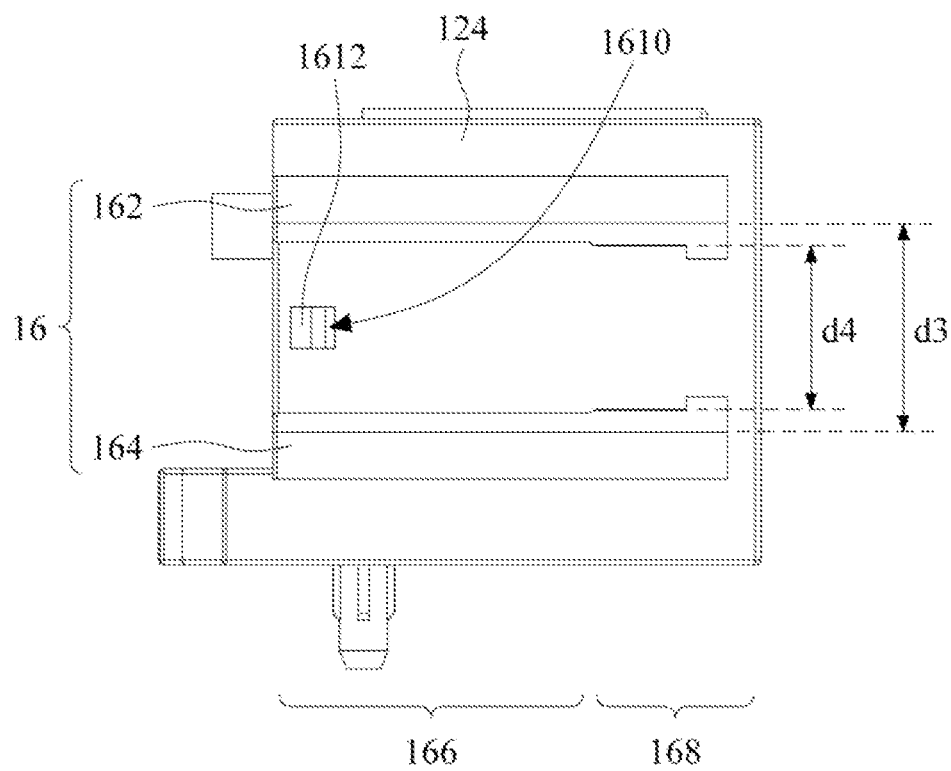
FIG. 3 is a schematic view of a slot module installed to the casing of the present invention as depicted in FIG. 1.

With reference to FIG. 3 for a schematic view of installing a slot module to a casing in accordance with the present invention, the slot module 16 is disposed on the second joint surface 124 and has a first guide slot 162 and a second guide slot 164. The first guide slot 162 and the second guide slot 164 are parallel to each other and provided for forming a first dovetail tenon hole 166 and a second dovetail tenon hole 168 respectively. An inner edge distance d3 between the first guide slot 162 and the second guide slot 164 of the first dovetail tenon hole 166 is greater than the inner edge distance d4 between the first guide slot 162 and the second guide slot 164 of the second dovetail tenon hole 168. In this embodiment, the inner edge distance d3, d4 refer to the distance between the inner edge of the first guide slot 162 and the inner edge of the second guide slot 164 as shown in the figure. In this embodiment, the inner edge distance d3, d4 of the dovetail tenon hole 166, 168 is greater than or equal to the outer edge distance d1, d2 of the dovetail tenon 146, 148.

In another embodiment, two inner edges of the dovetail tenon hole are formed into ribs respectively (not shown in the figure). In some embodiments, a side of the first guide block 142 away from the second guide block 144 is concaved inward to form a first concave structure 141, and a side of the second guide block 144 away from the first guide block 142 is concaved inward to form a second concave structure 143, and the first concave structure 141 and the second concave structure 143 are symmetrical to each other, so that the pin module 14 can be inserted into the slot module 16.

In this embodiment, the slot module 16 further comprises a second stopper 1610, and the second stopper 1610 has a second bevel 1612. The second stopper 1610 is disposed at the first dovetail tenon hole 166. In another embodiment, the slot module 16 can be disposed at any position of the slot module 16. Wherein, the second stopper 1610 is configured to be corresponsive to the first stopper 1410. When the first bevel 1412 of the first stopper 1410 of any connector touches the second bevel 1612 of the second stopper 1610 of another connector, the first bevel 1412 is acted on the second bevel 1612, and after the first stopper 1410 and the second stopper 1610 are staggered with each other, the first stopper 1410 and the second stopper 1610 are limited and latched with each other.

Figure 4:
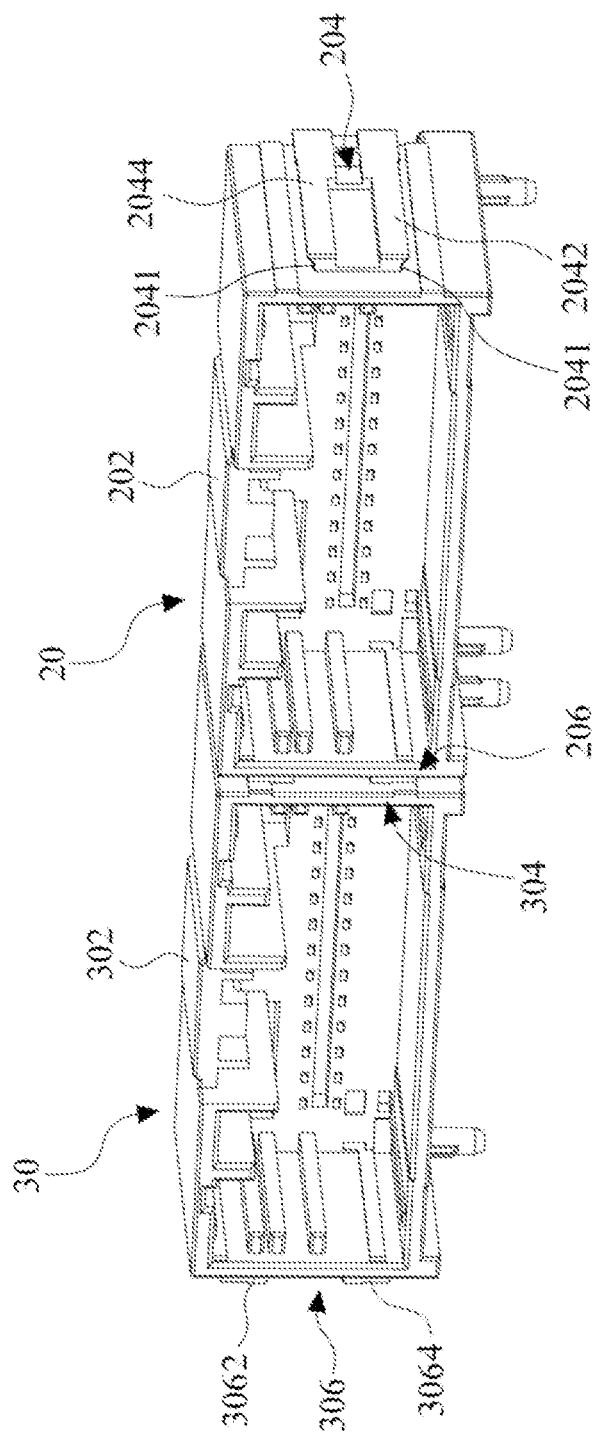
FIG. 4 is a schematic view of a first connector with a dovetail structure and a second connector with a dovetail structure in accordance with an embodiment of the present invention.
Figure 5:
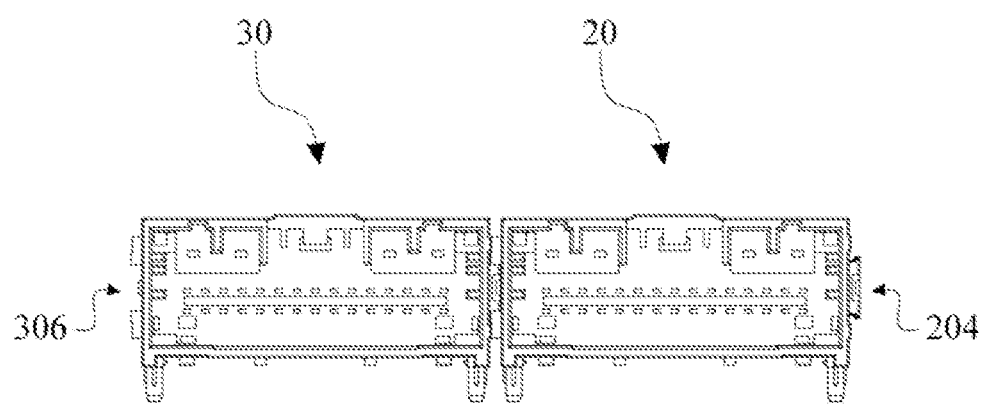
FIG. 5 is a front view of a first connector with a dovetail structure and a second connector with a dovetail structure in accordance with an embodiment of the present invention before assembling.
Figure 6:
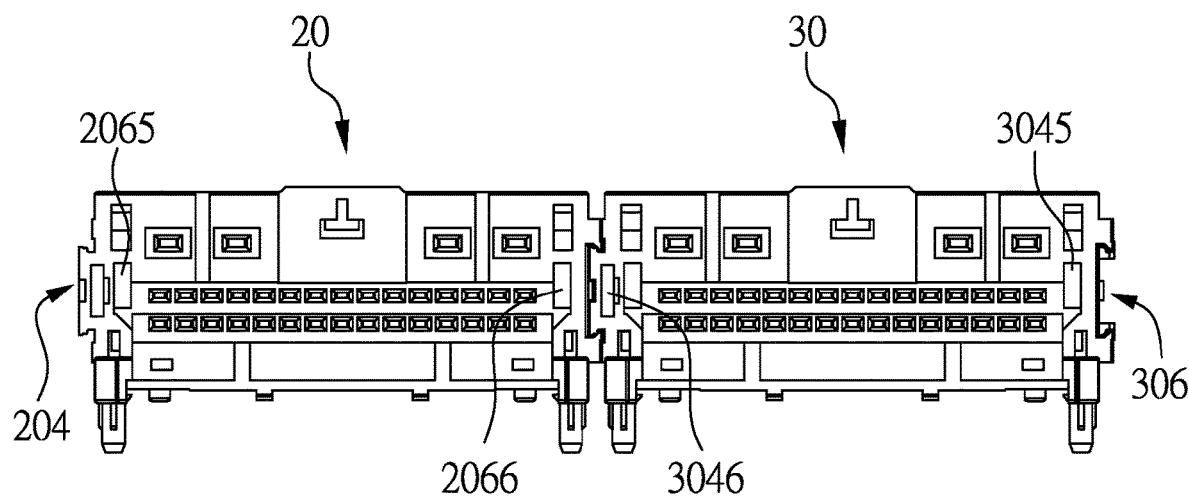
FIG. 6 is a rear view of a first connector with a dovetail structure and a second connector with a dovetail structure in accordance with an embodiment of the present invention after assembling.
Figure 7:
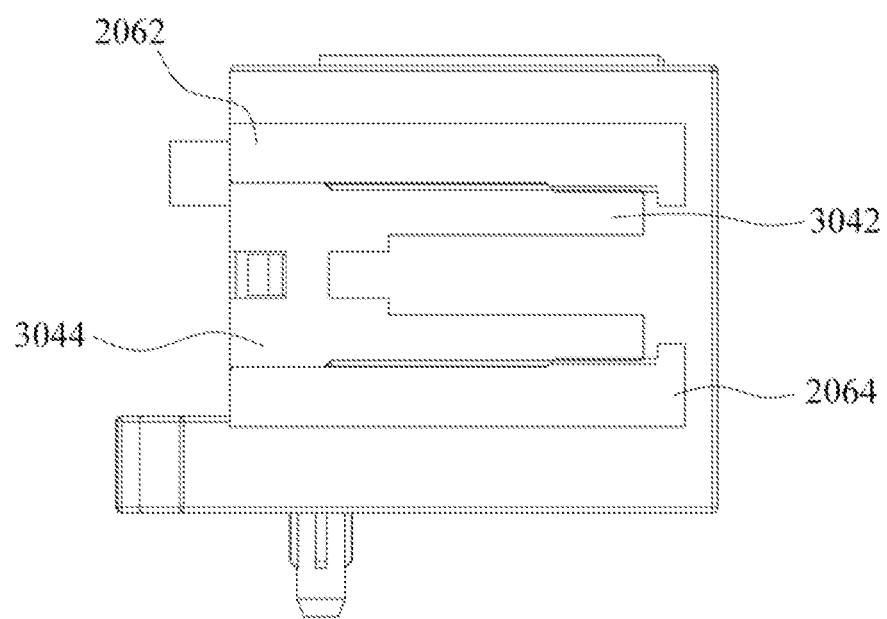
FIG. 7 is a cross-sectional view of a dovetail structure in accordance with an embodiment of the present invention.

With reference to FIGS. 4 to 7 for the schematic views of assembling a first connector with a dovetail structure and a second connector with a dovetail structure in accordance with an embodiment of the present invention, FIG. 5 is a front view showing the assembly of the first connector with the dovetail structure and the second connector with the dovetail structure, FIG. 6 is a rear view showing the assembly of the first connector with the dovetail structure and the second connector with the dovetail structure, and FIG. 7 is a cross-sectional view of a dovetail structure of an embodiment of the present invention.

In FIG. 4, a first connector 20 and a second connector 30 are provided.

The first connector 20 comprises a first casing 202 comprising a first joint surface and a second joint surface opposite to the first joint surface, a first pin module 204 and a first slot module 206 which are substantially the same as those described above, and thus will not be repeated.

In FIGS. 5 to 7, the first pin module 204 is disposed on the first joint surface of the first casing 202, and the first slot module 206 is disposed on the second joint surface of the first casing 202. The first pin module 204 is provided for forming a first dovetail tenon 2042 and a second dovetail tenon 2044. Wherein, an outer edge distance of the first dovetail tenon 2042 is smaller than the outer edge distance of the second dovetail tenon 2044.

The first slot module 206 is provided for forming a first dovetail tenon hole 2062 and a second dovetail tenon hole 2064. Wherein, an inner edge distance of the first dovetail tenon hole 2062 is greater than the inner edge distance of the second dovetail tenon hole 2064, and the inner edge distance is greater than or equal to the outer edge distance of the first dovetail tenon 2042 (or the second dovetail tenon 2044).

The second connector 30 comprises a second casing 302 comprising a third joint surface and a fourth joint surface opposite to the third joint surface, a second pin module 304 and a second slot module 306, which are substantially the same as those described above, and thus will not be repeated.

The second pin module 304 is disposed on the third joint surface of the second casing 302, and the second slot module 306 is disposed on the fourth joint surface of the second casing 302. In some embodiments, both sides of the first dovetail tenon 2042 and the second dovetail tenon 2044 are concaved inwards, each forming a first concave structure 2041, and the first concave structures 2041 are mutually symmetrical, and both sides of the third dovetail tenon 3042 and the fourth dovetail tenon 3044 are also concaved inwards, each forming a second concave structure 3041, and the second concave structures 3041 are mutually symmetrical.

The second pin module 304 is provided for forming a third dovetail tenon 3042 and a fourth dovetail tenon 3044. Wherein, the outer edge distance of the third dovetail tenon 3042 is smaller than the outer edge distance of the fourth dovetail tenon 3044.

The second slot module 306 is provided for forming a third dovetail tenon hole 3062 and a fourth dovetail tenon hole 3064. Wherein, the inner edge distance of the third dovetail tenon hole 3062 is greater than the inner edge distance of the fourth dovetail tenon hole 3064, and the inner edge distance is greater than or equal to the outer edge distance of the third dovetail tenon 3042 (or the fourth dovetail tenon 3044).

In FIG. 7, when the third dovetail tenon 3042 and the fourth dovetail tenon 3044 move along the first dovetail tenon hole 2062 and the second dovetail tenon hole 2064 respectively, the first slot module 206 combines with the second pin module 304. Until the third dovetail tenon 3042 touches the second dovetail tenon hole 2064 and the fourth dovetail tenon 3044 touches the first dovetail tenon hole 2062, the third dovetail tenon 3042 and the second dovetail tenon hole 2064 have interference with each other, and the first dovetail tenon 3044 and the first dovetail tenon hole 2062 have interference with each other to produce deformations, so that the first slot module 206 has a tight fit with the second pin module 304. As shown in FIG. 4, the first connector 20 is combined to the second connector 30 by engagement of the first slot module 206 of the first connector 20 with the second pin module 304 of the second connector 30. The combined state is shown in FIGS. 5 and 6.

It is noteworthy that a first deformation slot 2066 is formed on one end of the first casing 202 adjacent to the second joint surface where the first slot module 206 is disposed; and a second deformation slot 3046 is formed on one end of the second casing 302 adjacent to the third joint surface where the second pin module 304 is disposed. The first deformation slot 2066 and the second deformation slot 3046 are provided for absorbing the pressing and squeezing forces caused by the tight fit. In some embodiments, a third deformation slot 2065 is formed on the other end of the first casing 202 adjacent to the first joint surface where the first pin module 204 is disposed. The third deformation slot 2065 is adjacent to the first dovetail tenon hole 2062, and the third deformation slot 2065 and the first dovetail tenon hole 2062 are not located on same surface. A fourth deformation slot 3045 is formed on the other end of the second casing 302 adjacent to the fourth joint surface where the second slot module 306 is disposed. The fourth deformation slot 3045 is adjacent to the third dovetail tenon hole 3062, and the fourth deformation slot 3045 and the third dovetail tenon hole 3062 are not located on same surface.

While the invention has been described by means of specific embodiments, numerous modifications and variations could be made thereto by those skilled in the art without departing from the scope and spirit of the invention as set forth in the claims.

What is claimed is:

1. A connector with a dovetail structure, comprising:
a casing, comprising a first joint surface and a second joint surface opposite to the first joint surface;
a pin module, disposed on the first joint surface, and having a first guide block and a second guide block parallel to each other and a first dovetail tenon and a second dovetail tenon formed on the first guide block and the second guide block respectively, and a first outer edge distance existed between the first guide block and the second guide block of the first dovetail tenon, and a second outer edge distance existed between the first guide block and the second guide block of the second dovetail tenon, and the first outer edge distance is smaller than the second outer edge distance; and a slot module, disposed on the second joint surface, and having a first guide slot and a second guide slot parallel to each other and a first dovetail tenon hole and a second dovetail tenon hole formed on the first guide slot and the second guide slot respectively, and a first inner edge distance existed between the first guide slot and the second guide slot of the first dovetail tenon hole, and a second inner edge distance existed between the first guide slot and the second guide slot of the second dovetail tenon hole, and the first inner edge distance is greater than the second inner edge distance, wherein the first inner edge distance and the second inner edge distance are not smaller than the first outer edge distance and the second outer edge distance;
wherein a side of the first guide block away from the second guide block is concaved inward to form a first concave structure, and a side of the second guide block away from the first guide block is concaved inward to form a second concave structure, and the first concave structure and the second concave structure are symmetrical to each other, so that the pin module can be inserted into the slot module,
wherein a first deformation slot is formed on one end of the casing adjacent to the first joint surface, and the first deformation slot is adjacent to the second dovetail tenon.

2. The connector as claimed in claim 1, wherein a second deformation slot is formed on an other end of the casing adjacent to the second joint surface, and the second deformation slot is adjacent to the first dovetail tenon hole.

3. A connector assembly, comprising:
a first connector, comprising a first casing comprising a first joint surface and a second joint surface opposite to the first joint surface, a first pin module disposed on the first joint surface and a first slot module disposed on the second joint surface, and the first pin module having a first dovetail tenon and a second dovetail tenon formed thereon and the first slot module having a first dovetail tenon hole and a second dovetail tenon hole formed thereon, wherein a first outer edge distance of the first dovetail tenon hole is smaller than a second outer edge distance of the second dovetail tenon, and a first inner edge distance of the first dovetail tenon hole is greater than a second inner edge distance of the second dovetail tenon hole, and the first inner edge distance and the second inner edge distance are not smaller than the first outer edge distance and the second outer edge distance; and
a second connector, comprising a second casing comprising a third joint surface and a fourth joint surface, a second pin module disposed on the third joint surface and a second slot module disposed on the fourth joint surface, and the second pin module having a third dovetail tenon and a fourth dovetail tenon formed thereon, and the second slot module having a third dovetail tenon hole and a fourth dovetail tenon hole formed thereon, wherein a third outer edge distance of the third dovetail tenon is smaller than a fourth outer edge distance of the fourth dovetail tenon, and a third inner edge distance of the third dovetail tenon hole is greater than a fourth inner edge distance of the fourth dovetail tenon hole, and the third inner edge distance and the fourth inner edge distance are not smaller than the third outer edge distance and the fourth outer edge distance;
wherein, the first connector is combined to the second connector by engagement of the first slot module of the first connector with the second pin module of the second connector;
wherein both sides of the first dovetail tenon and the second dovetail tenon are concaved inwards, each forming a first concave structure, and the first concave structures are mutually symmetrical, and both sides of the third dovetail tenon and the fourth dovetail tenon are also concaved inwards, each forming a second concave structure, and the second concave structures are mutually symmetrical;
a first deformation slot is formed on one end of the first casing adjacent to the second joint surface, and the first deformation slot is adjacent to the second dovetail tenon, and the first deformation slot and the second dovetail tenon are not located on the same surface; and
a second deformation slot is formed on one end of the second casing adjacent to the third joint surface, and the second deformation slot is adjacent to the fourth dovetail tenon, and the second deformation slot and the fourth dovetail tenon are not located on the same surface.

4. The connector assembly as claimed in claim 3, wherein a third deformation slot is formed on an other end of the first casing adjacent to the first joint surface, and the third deformation slot is adjacent to the first dovetail tenon hole, and the third deformation slot and the first dovetail tenon hole are not located on the same surface.

5. The connector assembly as claimed in claim 3, wherein a fourth deformation slot is formed on an other end of the second casing adjacent to the fourth joint surface, and the fourth deformation slot is adjacent to the third dovetail tenon hole, and the fourth deformation slot and the third dovetail tenon hole are not located on the same surface.

* * * * *